United States Patent
Nienstaedt et al.

[15] 3,692,986
[45] Sept. 19, 1972

[54] PROCESS CONTROL METHOD AND APPARATUS FOR REGULATING TEMPERATURE

[72] Inventors: Robert Nienstaedt, Skensved, Denmark; James William Bunting, Leamington Spa, England

[73] Assignee: Courtaulds Engineering Limited

[22] Filed: Jan. 5, 1971

[21] Appl. No.: 104,112

[52] U.S. Cl. ............................235/151.1, 236/46
[51] Int. Cl. .................................................G05d 23/00
[58] Field of Search ..235/151.1, 150.1, 151; 236/46; 165/64, 169

[56] References Cited

UNITED STATES PATENTS

| | | | |
|---|---|---|---|
| 3,301,482 | 1/1967 | Bullen | 236/46 |
| 3,392,914 | 7/1968 | Nienstaedt | 235/151.1 X |
| 2,895,502 | 7/1959 | Roper et al. | 236/46 |
| 3,301,401 | 1/1967 | Amy et al. | 236/46 |
| 3,311,303 | 3/1967 | Noyes | 236/46 |
| 3,553,992 | 1/1971 | Harbaugh | 235/151.1 UX |

Primary Examiner—Joseph F. Ruggiero
Attorney—Davis, Hoxie, Faithfull & Hapgood

[57] ABSTRACT

A process control method comprises the steps of generating a first electrical signal representing a measured value of a process variable, generating a second electrical signal representing a desired value of said process variable, generating a third electrical signal, which changes at a prechosen rate corresponding to a desired rate of change of said measured value of said process variable, comparing said second electrical signal with said third electrical signal to generate a fourth electrical signal, applying said fourth electrical signal to cause said third electrical signal to tend towards equality with said second electrical signal, and comparing said first electrical signal with said third electrical signal to produce a process control signal therefrom. Apparatus for carrying out the method is also described as well as the application of the method to the control of the temperature of dyebath liquor.

15 Claims, 2 Drawing Figures

3,692,986

PROCESS CONTROL METHOD AND APPARATUS FOR REGULATING TEMPERATURE

This invention relates to a method and apparatus for effecting control of changes in a process variable, and more particularly for effecting such changes at pre-chosen rates.

One example of a process variable which the invention may be used to control is temperature. In many manufacturing operations which involve heating or cooling treatments, it is desirable not only to apply a controlled temperature, but also to ensure that the heating to and/or the cooling from such a temperature is carried out at a pre-chosen rate. Moreover, it may be necessary to vary the rate of heating and/or cooling in a pre-chosen manner in order to achieve some desired property in an end product. Examples of processes in which such temperature control is desirable include annealing treatments and textile dyeing operations.

In the latter, proper control of the dyeing operation normally requires that the dyebath liquor be brought to a precise temperature at a closely controlled rate, that it be held at the dyeing temperature for a predetermined period of time, and that it be subsequently cooled at the same, or another closely controlled rate. This is necessary to ensure uniformity of shade between successive batches of fabric treated in successive dyeing operations.

Hitherto it has been difficult to achieve smooth stepless control of process variable over extended periods of time, except by the use of mechanical devices, such as cams, whose profile is not readily alterable.

According to one aspect of this invention, a process control method includes the steps of generating a first electrical analogue representing a measured value of a process variable, generating a second electrical analogue representing a desired value of the same process variable, generating a ramp function (as hereinafter defined) at a pre-chosen rate corresponding to a desired rate of change in the measured value of the process variable, comparing said ramp function with the second electrical analogue to generate a signal, applying said signal so as to cause the ramp function to tend towards equality with the second electrical analogue, and comparing the first electrical analogue with the ramp function to derive at least one process control signal therefrom.

Preferably the method includes the initial step of bringing the starting point of the ramp function to the same value as the analogue of the measured process variable.

A process control apparatus according to a further aspect of this invention includes an electrical circuit comprising a first amplifier, (as hereinafter defined) one of whose inputs is connected to an electrical signal representing a desired value of a process variable, and the other of whose inputs is connected to a first input of a second amplifier, (as hereinafter defined) the other input to the second amplifier being connected to an electrical signal representing a measured value of the same process variable, a ramp function generator (as hereinafter defined) arranged to generate a ramp function at a prechosen rate corresponding to a desired rate of change in the measured value of the process variable, the input of the ramp function generator being connected to the output of the first amplifier and the direction of the ramp function being controlled thereby so as to tend to equalize said ramp function and the first signal, the output of the ramp function generator being applied to the common input to the first and second amplifiers, and means responsive to the output of the second amplifier to generate at least one process control signal.

Preferably the apparatus includes electric circuit means operable to connect the output of the second amplifier to the ramp function generator, whereby the output potential of the latter is initially caused to equal the second signal.

By "amplifier" in this specification we mean a high-gain, high input impedance differential amplifier, for example, of the kind generally known as an operational amplifier. Amplifiers of this kind are available both in the form of integrated circuits and as assemblies of discrete components. By "ramp function generator" we mean a circuit which produces an electrical signal the voltage of which changes at a constant rate for a period immediately following a period in which the voltage remains constant or changes at another rate, without a transitional voltage step between the periods. Hence, the term "ramp function" in this specification means the signal generated by a circuit of the aforesaid kind.

One circuit capable of use as a ramp function generator is for example that disclosed in British Patent Specification No. 1199150. A modification of this particular circuit which is especially convenient for use as a ramp function generator, is summarized below.

The modified circuit just referred to is an integrator circuit, and the invention includes a process control apparatus embodying at least one such integrator circuit.

A process control method and apparatus according to this invention will now be described, by way of example, with reference to the accompanying drawing, in which.

Figure 1:
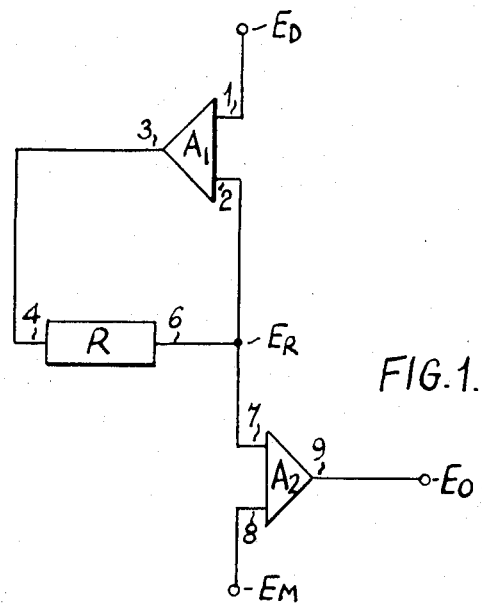
FIG. 1 is a block diagram of part of a process control apparatus.

In FIG. 1, which is intended only to illustrate the basic principles of the invention, a first amplifier $A_1$ has a first input 1, connected to an electrical signal having a potential $E_D$ which represents a desired value of a process variable, and a second input 2 connected to the output 6 of a ramp function generator R. The output 3 of the amplifier $A_1$ is connected to the input 4 of the ramp function generator R, the potential at the output 3 being designated $E_A$.

The output 6 of the ramp function generator R is also connected to one input 7 of a second amplifier $A_2$ whose other input 8 is connected to a signal having a potential $E_M$ and representing the measured value of the same process variable. The potential of the signal generated by the ramp function generator is designated $E_R$. The output 9 of the amplifier $A_2$ is connected to means (not shown) which is responsive to its output potential $E_O$ and serves to operate process control equipment (also not shown).

Both amplifiers are high-gain operational amplifiers connected in an open loop mode, so that even a very small potential difference between their inputs will result in an output potential the sign of which will depend on the sign of the input potential difference, and the magnitude of which will depend on the difference between the operating potentials supplied to the amplifier. Examples of suitable amplifiers which may be used are integrated circuit devices such as the Texas Instruments "SN 741P" and the Fairchild "$\mu$ A 709".

Therefore, the potential of the signal $E_D$ (which may be derived in any convenient way, for example from a potentiometer or from a further operational amplifier connected in the "summing mode"), when applied to the input 1 of the amplifier $A_1$, will result in the latter producing an output potential $E_A$ (which may be either positive or negative) depending on whether the signal $E_D$ is more or less than $E_R$, the potential at the other input 2.

If the potential $E_R$ equals the potential $E_D$, the output potential $E_A$ will be zero or very nearly so.

The potential $E_R$ (when the ramp function generator R operates) is arranged to rise or fall at a pre-chosen rate corresponding to a desired rate of change in the measured value of the process variable under control, the direction of the change being responsive to the sign of the output potential $E_A$ of the first amplifier $A_1$, such that the potential $E_R$ tends towards equality with the potential $E_D$. When the output potential $E_A$ of the first amplifier $A_1$ is zero then the potential $E_R$ is constant.

Because the potential $E_R$ is also applied to one input of the amplifier $A_2$, whose other input is connected to the potential $E_M$, the output potential $E_O$ will be either positive or negative, depending on the sign of the difference between the potentials $E_R$ and $E_M$. By suitably applying the potential $E_O$ to control the process variable from which the potential $E_M$ is derived, the circuit operates until the potential $E_O$ falls to zero, at which time the potential $E_R$ equals the potential $E_M$ and also equals the potential $E_D$, and the output potential $E_A$ from the first amplifier $A_1$ is zero. Thus, because the potential $E_R$ is generated at a pre-chosen rate, the process variable under control can be brought to a desired value at a pre-chosen rate, and because the direction of the ramp function is arranged to depend on the sign of the potential difference between the potentials $E_D$ and $E_R$, it does not matter whether the initial measured value of the process variable is above or below the desired value.

Figure 2:
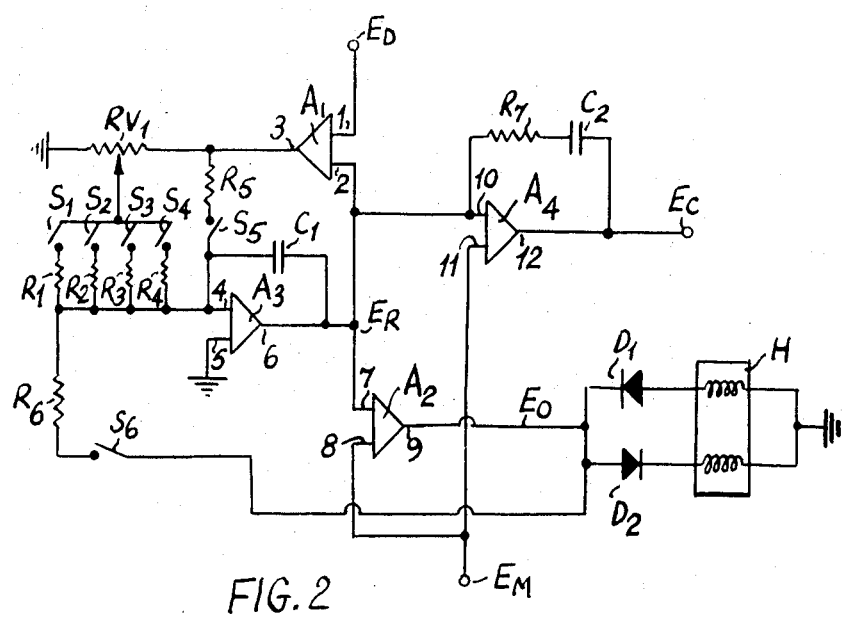
FIG. 2 is a schematic diagram of one practical form of the apparatus of FIG. 1, in which the ramp function generator is an integrator circuit.

In the practical circuit of FIG. 2, the ramp function generator is constituted by an integrator circuit comprising the amplifier $A_1$ of FIG. 1 and a further amplifier $A_3$, which has a capacitor $C_1$ connected between its output 6 and one of its inputs 4, the other input 5 being connected to a reference potential, in this case to earth which may be regarded as zero potential. For convenience, corresponding parts of both Figures bear the same designations.

The amplifier $A_3$ may be a device of the kind previously referred to, but where the process being controlled demands that the process variable be changed relatively slowly, or that it be controlled over an extended period, for example throughout a period of several hours, we prefer to use an amplifier having a high degree of stability. One example of a suitable amplifier is the Analog Devices "40-J", which includes a field-effect input stage, and which exhibits the desired low-drift operating characteristics.

A fraction of the output potential of the amplifier $A_1$ is tapped off at a potentiometer $R_{17}$ and is connected by switches $S_1$, $S_2$, $S_3$ and $S_4$ through resistors $R_1$, $R_2$, $R_3$ and $R_4$ to the of 4 of the amplifier $A_3$, the value of the capacitor $C_1$ and the values of these resistors being chosen such that the rates of change of the potential $E_R$ can be preselected corresponding to desired rates of change in the measured value of the process variable which is to be controlled. A switch $S_5$ and a resistor $R_5$ enable the resistors $R_{1-4}$ to be by-passed, for a purpose which will be explained later. In like manner, a switch $S_6$ and an associated resistor $R_6$ enable the input 4 to be connected to the output 9 of the amplifier $A_2$. The output of the latter is connected by a pair of diodes $D_1$ and $D_2$ to a polarized relay H.

A fourth amplifier, $A_4$ has an input 10 connected to the potential $E_R$ and has its other input 11 connected to the potential $E_M$. A capacitor $C_2$ and a resistor $R_7$ are connected in series between the input 10 and the output 12 of the amplifier $A_4$, whose output potential is denoted by $E_C$.

The means of supplying the operating potentials for the various amplifiers, together with other associated circuitry is, for simplicity, not shown.

The operation of the integrator circuit formed by the amplifiers $A_1$ and $A_2$ may be summarized as follows.

On closing one (or more) of the switches $S_{1-4}$, the capacitor $C_1$ begins to charge or discharge through the associated resistor, or resistors $R_{1-4}$, at a rate which is effectively determined by the time constant of the combination of these components, and in a direction determined by the sign of the output potential of the amplifier $A_1$. The potential $E_R$ therefore rises, or falls, as the case may be, until the circuit stabilizes at the point when the potential $E_R$ is the same for practical purposes as the potential $E_D$ supplied to the other input of the amplifier $A_1$.

In practice, the values of the resistors $R_{1-4}$ and the capacitor $C_1$, are chosen to give preselected rates of changes of the potential $E_R$ in accordance with desired rates of change in the measured value of the process variable under control, but a potentiometer could be used to give a manually variable rate of change, if so desired. The remainder of the circuit of FIG. 2 operates in the same way as that of FIG. 1.

However, one disadvantage of the basic arrangement of FIG. 1 is that the initial value of the potential $E_R$ may not be, and in practice usually is very different from, the potential $E_M$. This means that the ramp function will start to operate from some unknown point relative to the actual measured value of the process variable represented by the potential $E_M$.

This may be simply and effectively overcome by means of the switch $S_6$ and its associated resistor $R_6$. On closing the switch $S_6$, the output potential $E_O$ of the amplifier $A_2$ is connected, through the resistor $R_6$, to the input 4 of the amplifier $A_3$ and these two amplifiers then form an integrator circuit, in the same way as do amplifiers $A_1$ and $A_3$.

By making the time constant of the combination of the capacitor $C_1$ and the resistor $R_6$ sufficiently small in comparison to that of the capacitor $C_1$ and the resistors $R_{1-4}$, this integrator circuit causes the potential $E_R$ to change rapidly until it equals the potential $E_M$. On opening the switch $S_6$, the potential $E_A$ from the amplifier $A_1$ resumes control of the ramp function which thus starts from the potential $E_M$. In practice, this may be achieved by making the value of the resistor $R_6$ much less than any of the resistors $R_{1-4}$.

Likewise, if it is desired at any time to cause the process variable under control to change as quickly as possible to the desired value represented by $E_D$, the switch $S_5$ may be closed, allowing the capacitor $C_1$ to charge rapidly through the resistor $R_5$, the latter also being made vary much smaller than any of the resistors $R_{1-4}$. In this case of course, the potential $E_R$ is driven rapidly towards the potential $E_D$, in the same manner that it can be driven towards the potential $E_M$ by the switch $S_6$.

In the circuit of FIG. 2, the output potential $E_O$ of the amplifier $A_2$ is always either positive or negative, with respect to earth, or to some arbitrary zero.

The diodes $D_1$ and $D_2$ are back-connected so that the polarized relay H will change state, depending on the sign of the potential $E_O$. The relay contacts (not shown) may operate a conventional servo-control system in which one or more process controls are turned on and off, according to whether the potential $E_M$ is greater or smaller than the potential $E_D$, but a more convenient arrangement makes use of the amplifier $A_4$. This develops an output potential $E_O$, related to the potential $E_M$ and that of the ramp function $E_R$. The output potential $E_C$ is of the known "proportional-plus-integral" kind, being an analogue of the potential difference between the potentials $E_R$ and $E_M$. This output potential $E_C$ can be made to have a specific relationship to the potentials $E_R$ and $E_M$, depending on the values of the capacitor $C_2$ and the resistor $R_7$ and this can be particularly useful for close control of certain process variables, such as temperature.

The process control method and apparatus described in relation to FIGS. 1 and 2 is particularly convenient for the control of temperature in a dyeing operation because it enables the dyebath liquor to be brought to a precise temperature at a closely controlled rate from an initial temperature which may be above or below the desired final temperature.

Furthermore, successive dyeing operations can be carried out under the same conditions thereby ensuring good uniformity of shade between successive batches of fabric.

In the case of such temperature control processes, the relay output circuitry could be arranged to select "- heating" or "cooling", and the output potential $E_C$ could then be arranged to control the exact amount of either of these to be applied to the process.

Further amplifiers may also be used in addition to the amplifiers $A_2$ and $A_4$, in order to compare the potentials $E_R$ and $E_M$. For example signals may be produced when one of these potentials exceeds the other, indicating that the measured value of the process variable is above or below its desired value, or a signal may be produced to indicate that the potentials are equal, showing that the measured value equals the desired value.

The potential $E_D$ may be generated in any convenient manner, for example by means of a potentiometer. The potential $E_M$, in the case of a temperature control process, may be generated by a thermocouple device or a resistance thermometer. If required, either or both of the potentials $E_D$ and $E_M$ may be connected to the circuits of FIGS. 1 and 2 by buffer amplifiers, and operational amplifiers of the types referred to earlier in relation to FIG. 1 may be used for this purpose, for example by connecting them in the well-known "summing mode".

What is claimed is:

1. A process control method, comprising the steps of:
   i. generating a first electrical signal representing a measured value of a process variable,
   ii. generating a second electrical signal representing a desired value of said process variable,
   iii. generating a third electrical signal, which changes at a prechosen rate corresponding to a desired rate of change of said measured value of said process variable,
   iv. comparing said second electrical signal with said third electrical signal to generate a fourth electrical signal,
   v. applying said fourth electrical signal to cause said third electrical signal to change at the prechosen rate towards equality with said second electrical signal, and
   vi. comparing said first electrical signal with said third electrical signal to produce a process control signal therefrom.

2. A process control method according to claim 1, including a further step of causing the third electrical signal to have an initial value which is equal to the first electrical signal.

3. A method of controlling the temperature of a dyebath, comprising the steps of:
   i. generating a first electrical signal representing a measured value of the dyebath temperature,
   ii. generating a second electrical signal representing a desired value of the dyebath temperature,
   iii. generating a third electrical signal, which changes at a prechosen rate corresponding to a desired rate of change of the measured value of the dyebath temperature,
   iv. comparing said second electrical signal with said third electrical signal to generate a fourth electrical signal,
   v. applying said fourth electrical signal to cause said third electrical signal to change at the prechosen rate towards equality with said second electrical signal, and
   vi. comparing said first electrical signal with said third electrical signal to produce a temperature control signal therefrom.

4. A process control apparatus comprising an electrical circuit having:
   a means for generating a first electrical signal representing a desired value of a process variable,
   a means for generating a second electrical signal representing a measured value of said process variable, a first operational amplifier, with an output and a first and second input thereto, said first input being connected to said first signal.
   a second operational amplifier with an output and a first and a second input thereto, said first input to the second operational amplifier being connected to the second input to the first operational amplifier, a means for generating a third electrical signal, whose value changes at a prechosen rate corresponding to a desired rate of change of said measured value, said means having an input and output, said output being connected to the second input to the first operational amplifier to generate a fourth electrical signal at the output thereof, said fourth electrical signal being applied to the input to the means for generating the third electrical signal, whereby the latter tends towards equality with the first electrical signal, and, means responsive to the output of the second operational amplifier to generate a process control signal.

5. Apparatus according to claim 4 including switch means operable to connect the output of said second operational amplifier to the input to the means for generating the third electrical signal, whereby the latter is caused to equal the second electrical signal.

6. Apparatus according to claim 4 wherein said means for generating the third electrical signal comprises said first operational amplifier and a third operational amplifier having an output and a first and a second input thereto, and a capacitor connected between said output and said first input, the second input being connected to a reference potential, the output of said third operational amplifier being connected to the second input to said first operational amplifier, and the output of the latter amplifier being connected to the first input to the third operational amplifier through a resistor, whereby the electrical charge on said capacitor changes at a prechosen rate determined by the time constant of said resistor and said capacitor, the direction of said change being responsive to the sign of the output of the first operational amplifier.

7. Apparatus according to claim 5 wherein said means for generating the third electrical signal comprises said first operational amplifier and a third operational amplifier having an output and a first and a second input thereto, and a capacitor connected between said output and said first input, the second input being connected to a reference potential, the output of said third operational amplifier being connected to the second input to said first operational amplifier, and the output of the latter amplifier being connected to the first input to the third operational amplifier through a resistor, whereby the electrical charge on said capacitor changes at a prechosen rate determined by the time constant of said resistor and said capacitor, the direction of said change being responsive to the sign of the output of the first operational amplifier.

8. A process control apparatus comprising an electrical circuit having:

a means for generating a first electrical signal representing a desired value of a process variable, a means for generating a second electrical signal representing a measured value of said process variable, a first operational amplifier, with an output and a first and a second input thereto, said first input being connected to said first signal, a second operational amplifier with an output and a first and second input thereto, said first input to the second operational amplifier being connected to the second input to the first operational amplifier, a third operational amplifier having an output and a first and second input thereto, and a capacitor connected between said output and said first input, the second input being connected to a reference potential, the output of said third operational amplifier being connected to the second input to said first operational amplifier, and the output of the latter amplifier being connected to the first input to the third operational amplifier through a resistor whereby a third electrical signal whose value changes at a prechosen rate corresponding to a desired rate of change of said measured value is generated at the output of said third operational amplifier, said third electrical signal tending towards equality with the first electrical signal, means responsive to the output of said second operational amplifier to generate a process control signal, and switch means operable to connect the output of said second operational amplifier to the first input to the third operational amplifier, whereby the third electrical signal is caused to equal the second electrical signal.

9. A process control apparatus according to claim 8, including a plurality of resistors and associated switch means whereby the output of the first operational amplifier is selectively connectable through the resistors by the associated switch means to the first input of the third operational amplifier, so that the rate of change of the third electrical signal corresponding to a desired rate of change of said measured value may be preselected.

10. A process control apparatus according to claim 9, wherein the means responsive to the output of the second operational amplifier is a polarized relay.

11. A process control apparatus according to claim 8 including a fourth operational amplifier with an output and a first and second input thereto, and a capacitor and a resistor connected in series between said output and said first input, said first input being connected to the output of the third operational amplifier, and said second input to the fourth operational amplifier being connected to the second electrical signal, whereby the fourth operational amplifier generates a signal whose magnitude is proportional to the difference between the second and third electrical signals, 12. A process control apparatus according to claim 9 including a fourth operational amplifier with an output and a first and second input thereto, and a capacitor and resistor connected in series between said output and said first input, said first input being connected to the output of the third operational amplifier, and said second input to the fourth operational amplifier being connected to the second electrical signal, whereby the fourth operational amplifier generates a signal whose magnitude is proportional to the difference between the second and third electrical signals.

13. A process control apparatus according to claim 9 for controlling temperature in a process wherein the means for generating the first electrical signal includes a thermocouple device.

14. A process control apparatus according to claim 9 wherein the means for generating the first electrical signal includes a resistance thermometer.

15. A temperature control apparatus comprising an electrical circuit having:
- a means for generating a first electrical signal representing a desired value of the variable temperature,
- a means for generating a second electrical signal representing a measured value of said temperature,
- a first operational amplifier, with an output and a first and a second input thereto, said first input being connected to said first signal,
- a second operational amplifier with an output and a first and a second input thereto, said first input to the second operational amplifier being connected to the second input to the first operational amplifier,
- a means for generating a third electrical signal, whose value changes at a prechosen rate corresponding to a desired rate of change of said measured value,
- said means having an input and output, said output being connected to the second input to the first operational amplifier to generate a fourth electrical signal at the output thereof, said fourth electrical signal being applied to the input to the means for generating the third electrical signal, whereby the latter tends towards equality with the first electrical signal, and,
- means responsive to the output of the second operational amplifier to generate a temperature control signal.

* * * * *